UNITED STATES PATENT OFFICE.

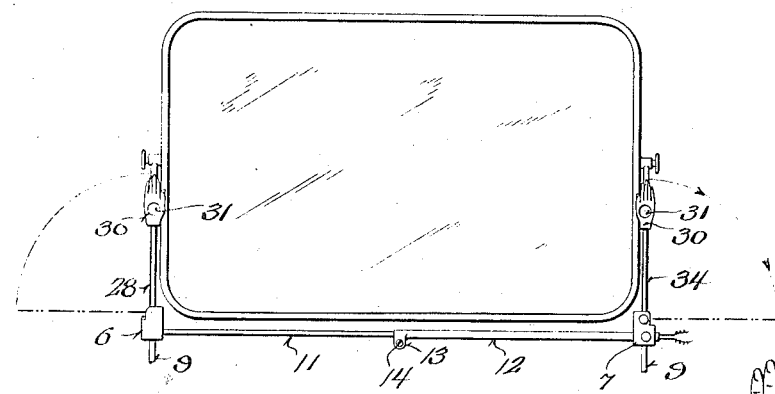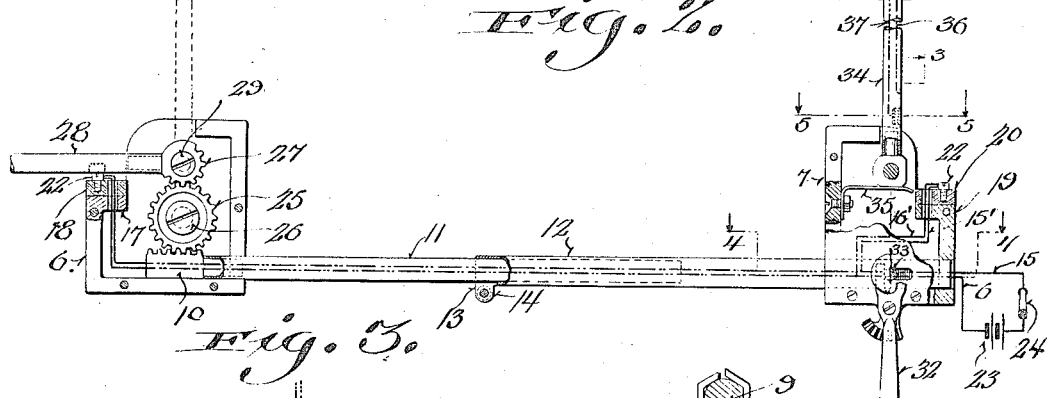

BORNETT L. BOBROFF, OF MILWAUKEE, WISCONSIN.

VEHICLE SIGNAL APPARATUS.

1,149,245. Specification of Letters Patent. Patented Aug. 10, 1915.

Application filed December 5, 1914. Serial No. 875,593.

*To all whom it may concern:*

Be it known that I, BORNETT L. BOBROFF, a citizen of the United States, and resident of Milwaukee, in the county of Milwaukee and State of Wisconsin, have invented certain new and useful Improvements in Vehicle Signal Apparatus; and I do hereby declare that the following is a full, clear, and exact description thereof.

My invention consists in what is herein particularly set forth with reference to the accompanying drawings and pointed out in the claims of this specification, its object being to provide motor vehicles with simple, economical and efficient means by which the driver of each may mechanically signal the direction of a proposed turning, instead of having to extend one of his hands from a side of the vehicle, as is customary practice and obviously detrimental to good control of said vehicle.

Figure 1 of the drawings represents a front elevation of signal apparatus in accordance with my invention attached to windshield standards of an automobile; Fig. 2 a partly sectional front elevation of the signal apparatus, and Figs. 3, 4 and 5 partly sectional views of details of said mechanism respectively indicated by lines 3—3, 4—4 and 5—5 in Fig. 2.

Referring by numerals to the drawings, 6 indicates one and 7 another of a pair of housings applicable to windshield standards or other convenient opposite parts of an automobile, the housing 7 being shown at 8 in Figs. 4 and 5, as provided with a clamp having the jaws thereof gripping a windshield standard 9.

Arranged to slide in the housing 6 is a rack-end 10 of a tube 11 telescoped and rigidly secured, in adjusted position, partly within a sleeve 12 that has sliding engagement with the housing 7. As a matter of detail, the outer end of the sleeve is split and provided with lugs 13 engaged by a clamping-screw 14, the tightening of the screw serving to effect the rigid connection of the rack-tube in said sleeve, but the same result may be otherwise attained without departure from what is claimed herein, the telescopic adjustment of said tube and sleeve serving to determine the distance between the housings 6 and 7 as occasion may require. The sleeve and tube together form a conduit, and wires 15, 16, of an electric-circuit are run through the conduit as well as through an opening in an inner ledge 17 of the housing 6 where each of them connects with a contact-screw in a block 18 of insulation fast on said ledge. Branch wires 15', 16', are connected to the wires 15 and 16 and extend laterally through the conduit and an opening in an inner ledge 19 of the housing 7, and these branch wires are each connected to a contact-screw in a block 20 of insulation fast on said ledge. The contact-screws 21 and 22 are similar in both insulations 18 and 20, one pair of said screws being shown in Fig. 5. A suitably arranged battery 23 or other source of electricity, and a make-and-break switch 24 are in the circuit aforesaid. The rack-end of the tube 10 is in mesh with a spur-wheel 25 on a bearing-screw 26 in the housing 6, and said wheel meshes with a pinion-end 27 of a tubular arm 28 on another bearing-screw 29 in said housing. The arm 28 is a visible signal in itself and it is preferable to have its outer end fast in a target 30 simulating a human hand, said target being provided with a central aperture in which to arrange an incandescent electric-lamp 31. By means of the described gearing, the arm 28 is swung in a slot of the housing from vertical to horizontal position or the reverse, and as herein shown the operation may be facilitated by a forked lever 32 fulcrumed on the housing 7 astraddle of a headed stem 33 extending laterally from the sleeve 12 in which the rack-tube 10 is fastened.

The pivotally adjustable tubular signal-arm 34 is shown associated with the housing 7 to be swung in a slot of said housing from vertical to horizontal position or the reverse, and its pivot-end is slabbed to have extended contact with a friction spring 35, under tension, when said arm is in either of said positions. A target and lamp similar to those above specified, and similarly indicated, are preferably associated with the signal arm 34, and said arm is provided with an operating stem 34' that has its bearings in the housing 7 and is within convenient reach of the driver of the vehicle.

As shown in Figs. 2, 3 and 5, each of the signal-arms has a wire 36 for the electric lamp therewith soldered or otherwise suitably fastened therein, and another lamp-wire 37, extended through an aperture in said arm, is attached to a contact-screw 38 in a block 39 of insulation fast on a lug of said arm. The electric-circuit aforesaid being closed and a signal-arm swung from vertical to horizontal position, said arm will close on a contact 21 and the contact 38 will close on a contact 22 to energize the lamp with the aforesaid arm.

The fronts of the housings 6 and 7 are removable to provide for ready access to the interior of said housings whenever necessary or desirable.

Either signal is swung from normally vertical position to approximately horizontal position, to indicate a direction of turning proposed by the driver of the vehicle equipped with said arms, and said signal is left in the adjusted position until the turning is completed, said driver in the meanwhile having the use of both hands to control the vehicle.

I claim:

1. The combination of opposite housings in connection with a motor vehicle, a conduit having sliding engagement with the housings, means for shifting the conduit, a signal-arm pivotally supported in each housing to have play in an outer side slot of the same, gearing connecting the conduit with one of the signal-arms, independent shifting means for the other signal arm, an electric-circuit having wires thereof extending through the conduit and housings, and an incandescent electric lamp with each signal-arm having connections for inclusion in said circuit when said arm is shifted its full adjustment out of normal position.

2. The combination of opposite housings in connection with a motor vehicle, a sleeve in sliding engagement with one of the housings, sleeve-shifting means, a tube held in telescopic engagement with the sleeve to therewith form a conduit and which has sliding engagement with the other of said housings, a signal-arm pivotally supported in each housing to have play in an outer side slot of the same, gearing connecting one of the signal-arms with the tube member, means by which pivotal adjustment of the other signal arm is controlled, an electric circuit having wires thereof extending through said conduit and housings, and an incandescent electric-lamp with each signal-arm having connections for inclusion in said circuit when said arm is shifted its full adjustment out of normal position.

In testimony that I claim the foregoing I have hereunto set my hand at Milwaukee in the county of Milwaukee and State of Wisconsin in the presence of two witnesses.

B. L. BOBROFF.

Witnesses:
  N. E. OLIPHANT,
  M. E. DOWNEY.